US010739441B2

(12) United States Patent
Nabbe

(10) Patent No.: US 10,739,441 B2
(45) Date of Patent: Aug. 11, 2020

(54) SYSTEM AND METHOD FOR ADJUSTING A LIDAR SYSTEM

(71) Applicant: Faraday & Future Inc., Gardena, CA (US)

(72) Inventor: Bartholomeus C. Nabbe, Redwood City, CA (US)

(73) Assignee: FARADAY & FUTURE INC., Gardena, CA (US)

(*) Notice: Subject to any disclaimer, the term of this patent is extended or adjusted under 35 U.S.C. 154(b) by 0 days.

(21) Appl. No.: 15/721,274

(22) Filed: Sep. 29, 2017

(65) Prior Publication Data
US 2019/0195992 A1 Jun. 27, 2019

Related U.S. Application Data

(60) Provisional application No. 62/401,608, filed on Sep. 29, 2016.

(51) Int. Cl.
*G01C 3/08* (2006.01)
*G01S 7/481* (2006.01)
(Continued)

(52) U.S. Cl.
CPC ............ *G01S 7/4817* (2013.01); *G01S 17/06* (2013.01); *G01S 17/86* (2020.01); *G01S 17/93* (2013.01);
(Continued)

(58) Field of Classification Search
CPC ........ G01S 7/4817; G01S 17/93; G01S 17/06; B60W 2420/52
See application file for complete search history.

(56) References Cited

U.S. PATENT DOCUMENTS

| 5,006,721 A * | 4/1991 | Cameron | G01S 7/4811 |
| | | | 250/559.16 |
| 2010/0053715 A1* | 3/2010 | O'Neill | G01S 7/4817 |
| | | | 359/199.3 |

(Continued)

OTHER PUBLICATIONS

Niclass, Christiano. "A 0.18 micrometer CMOS SoC for a 100-m-Range 10-Frame/s 2-x 96-Pixel Time-of-Flight Depth Sensor." IEEE Journal of Solid-State Circuits, vol. 49, No. 1, Jan. 2014. https://ieeexplore.ieee.org/stamp/stamp.jsp?tp=&arnumber=6637103&tag=1 (Year: 2014).*

(Continued)

*Primary Examiner* — Samantha K Abraham

(57) ABSTRACT

In some examples, a system comprises a laser light source and a rotatable mirror assembly comprising a plurality of mirror segments, the rotatable mirror assembly aligned to reflect light transmitted by the laser light source, wherein the plurality of mirror segments comprise a first segment that reflects a first light beam from the laser light source in a first direction, and a second mirror segment that reflects the first light beam from the laser light source in a second direction, different from the first direction. In some examples, the system comprises a light sensor positioned to receive light reflected from the rotatable mirror assembly. In some examples, the system comprises a motor for rotating the mirror assembly about a rotation axis. In some examples, the system comprises a controller for controlling a sampling phase of sampling the light sensor.

12 Claims, 11 Drawing Sheets

(51) Int. Cl.
    *G01S 17/06*     (2006.01)
    *G01S 17/93*     (2020.01)
    *G01S 17/86*     (2020.01)
    *G01S 17/931*     (2020.01)

(52) U.S. Cl.
    CPC ........ *G01S 17/931* (2020.01); *B60W 2420/52* (2013.01)

(56) References Cited

U.S. PATENT DOCUMENTS

2015/0092184 A1*   4/2015   Schultz ................ G02B 26/101
    356/5.01
2015/0185313 A1*   7/2015   Zhu ........................ G01S 17/08
    365/5.01

OTHER PUBLICATIONS

Renishaw. "Optical encoders and LiDAR scanning." Sep. 18, 2016. https://web.archive.org/web/20160918064009/https://www.renishaw.com/en/optical-encoders-and-lidar-scanning--39244 (Year: 2016).*

White, Russell A., et al. "Forest Roads Mapped Using LiDAR in Steep Forested Terrain." Remote Sens. 2010, 2, 1120-1141. file:///C:/Users/sabraham/Downloads/remotesensing-02-01120.pdf (Year: 2010).*

\* cited by examiner

SYSTEM AND METHOD FOR ADJUSTING A LIDAR SYSTEM

CROSS-REFERENCE TO RELATED APPLICATIONS

This application claims the benefit of U.S. Provisional Application No. 62/401,608, filed Sep. 29, 2016, the entirety of which is hereby incorporated by reference.

FIELD OF THE DISCLOSURE

This relates generally to an adjustable scanning a Light Imaging, Detection, And Ranging ("LiDAR") system, and more particularly to a mirror arrangement and scanning strategy for an adjustable scanning LiDAR system.

BACKGROUND OF THE DISCLOSURE

Modern vehicles, especially automobiles, increasingly use systems and sensors for detecting and gathering information about the vehicle's location. Autonomous vehicles can use such information for performing autonomous, partially autonomous, and driver assistance driving operations. Many autonomous, semi-autonomous, and driver assistance driving actions rely on cooperation from a multitude of sensors including cameras, LiDAR, and ultrasonic sensing, among others. A scanning LiDAR mounted on a vehicle can be used for obtaining object detection and ranging. In some scanning LiDAR systems, a scanning pattern of the LiDAR system can have fixed angles relative to the vehicle. Fixed angle scanning patterns can work well when the orientation of the vehicle remains constant with respect to the road, but may provide reduced performance when the angle of the vehicle relative to the road changes (e.g., at a dip, bump, cresting a hill, etc.). Accordingly, a LiDAR system that can provide variable angle scanning patterns can provide improved performance.

SUMMARY OF THE DISCLOSURE

Some vehicles, such as automobiles, may include various systems and sensors for estimating the vehicle's position and/or orientation. Autonomous vehicles can use such information for performing autonomous driving and/or parking operations. A vehicle can utilize Global Positioning System (GPS) and/or other Global Navigation Satellite System (GNSS) techniques to obtain location information of the vehicle. An inertial measurement unit (IMU) can also optionally be employed to provide information about the vehicle's heading, speed, acceleration and the like. Other sensors such as cameras, LiDAR, RADAR, ultrasonic sensors etc. can be used to assist navigation and collision avoidance. The present disclosure particularly pertains to LiDAR systems and methods of operation. While the terms "autonomous" and "autonomous navigation" are referred to herein, it should be understood that the disclosure is not limited to situations of full autonomy. Rather, fully autonomous driving systems, partially autonomous driving systems, and/or driver assistance systems can be used while remaining within the scope of the present disclosure.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples.

Some vehicles, such as automobiles, may include various systems and sensors for estimating the vehicle's position and/or orientation. Autonomous vehicles can use such information for performing autonomous driving and/or parking operations. A vehicle can utilize Global Positioning System (GPS) and/or other Global Navigation Satellite System (GNSS) techniques (e.g., BeiDou, Galileo, etc.) to obtain location information of the vehicle. An inertial measurement unit (IMU) can also optionally be employed to provide information about the vehicle's heading, speed, acceleration and the like. Other sensors such as cameras, LiDAR, RADAR, ultrasonic sensors etc. can be used to assist navigation and collision avoidance. The present disclosure particularly pertains to LiDAR systems and methods of operation. While the terms "autonomous" and "autonomous navigation" are referred to herein, it should be understood that the disclosure is not limited to situations of full autonomy. Rather, fully autonomous driving systems, partially autonomous driving systems, and/or driver assistance systems can be used while remaining within the scope of the present disclosure.

Figure 1A:
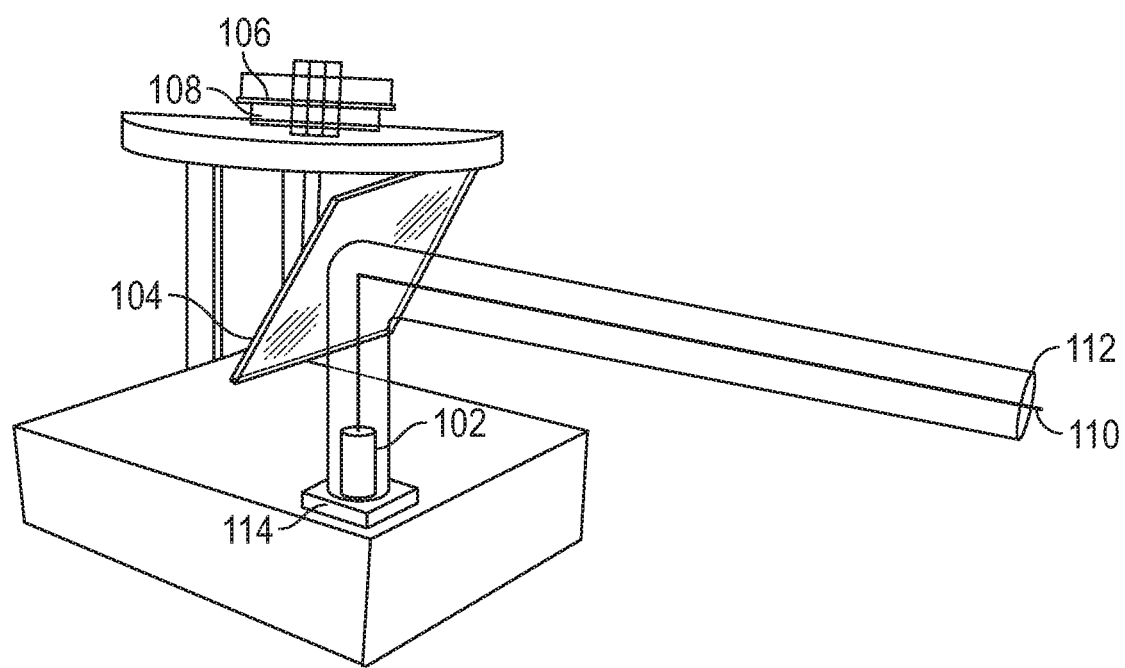
FIGS. 1A-1B illustrate top and side views of a scanning LiDAR configuration according to examples of the disclosure.
Figure 1B:
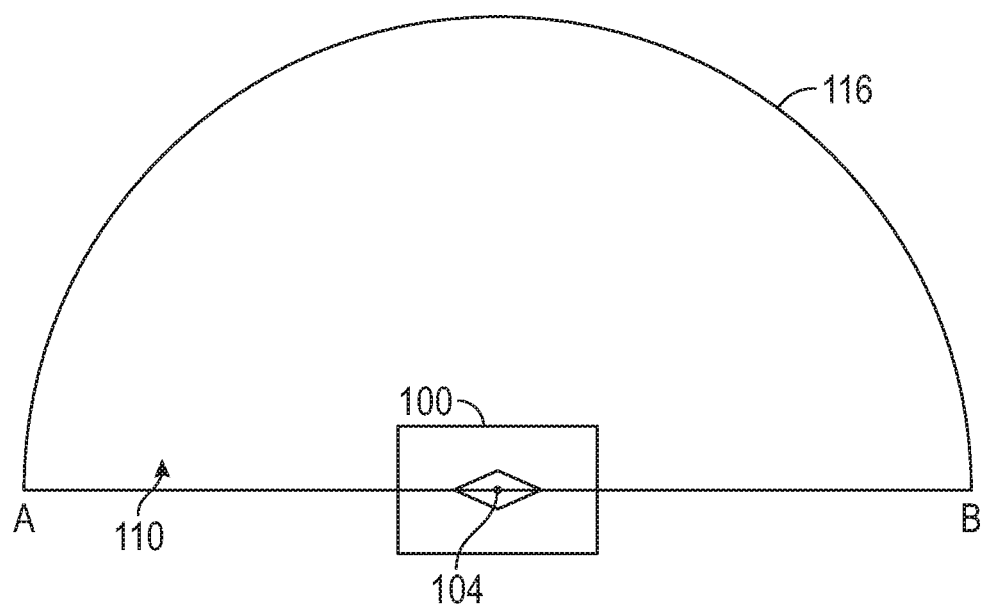

FIGS. 1A-1B illustrate top and side views of a scanning LiDAR configuration according to examples of the disclosure. FIG. 1A illustrates a scanning LiDAR 100 configuration that employs a single rotatable mirror 104 according to examples of the disclosure. A scanning LiDAR 100 unit such as the one illustrated can be mounted on the roof of a vehicle, or can otherwise be attached to and/or integrated with a portion of a vehicle chassis. The illustrated scanning LiDAR 100 system includes a laser light source 102 that can act as an illumination source for illuminating a target scene. The laser light source 102 can be pointed toward a rotatable mirror 104, which can be attached by a shaft to a motor 106. A position encoder 108 (e.g., an encoder wheel) can be used to determine the rotational position of the mirror, and the rotational position of the mirror can be used to determine the direction that the mirror is pointing. In the illustrated example, mirror 104 can reflect at an angle of 90 degrees toward a target scene as illustrated by transmitted beam 110 (e.g., to the front and sides of the scanning LiDAR 100). If the transmitted beam 110 encounters and object, a portion of the transmitted light can reflect from the object and return toward the mirror 104. The reflected beam 112 can reflect from the mirror 104 back toward the direction of the laser light source 102 and can be directed toward a light sensor 114. The light sensor 114 can be a silicon photodiode, avalanche photodiode, photomultiplier, or other photoelectric sensor that can detect the reflected laser light. In some examples, the light sensor 114 can be integrated into the same unit as the laser light source. In some examples, a beam splitter can be used to redirect the reflected beam toward the light sensor 114.

FIG. 1B illustrates a top view of the scanning LiDAR 100 and an exemplary scan arc that can correspond to rotation of the rotatable mirror 104. As the rotatable mirror rotates (e.g., in a clockwise direction), the transmitted beam 110 can begin pointing toward point A, and can rotate around the direction of arc 116 (e.g., in a clockwise direction until reaching point B). A 180 degree scan is illustrated in the figure, although different scan angles are possible depending on the physical configuration of the LiDAR system. In the configuration illustrated in FIG. 1A, the physical structure of the LiDAR system 100 (e.g., a portion of the chassis that connects the motor unit with the lights source/sensor assembly) may block the reflected beam over a portion of the rotation range of the mirror 104. In some examples, as the transmitted beam 110, sweeps around arc 116, if any object is in the path of the transmitted beam a portion of the transmitted light can reflect from the object and return toward the mirror 104. In some examples, the reflected beam (e.g., 112 above) can reflect from the mirror 104 back toward the direction of the laser light source 102 and can be directed toward the light sensor 114. In some examples, the angle of the mirror 104 when the reflected beam 112 is received at the light sensor 114 can be determined by the position encoder 108 and can be used to determine the direction of the object. In some examples, the range can be determined by measuring a time of flight of the reflected beam 112 or by other ranging techniques. By taking measurements at multiple angles along the arc 116, an image of objects can be produced. In some examples for a LiDAR with a single laser light source 102, the image can correspond to a specific height above a road.

Figure 2A:
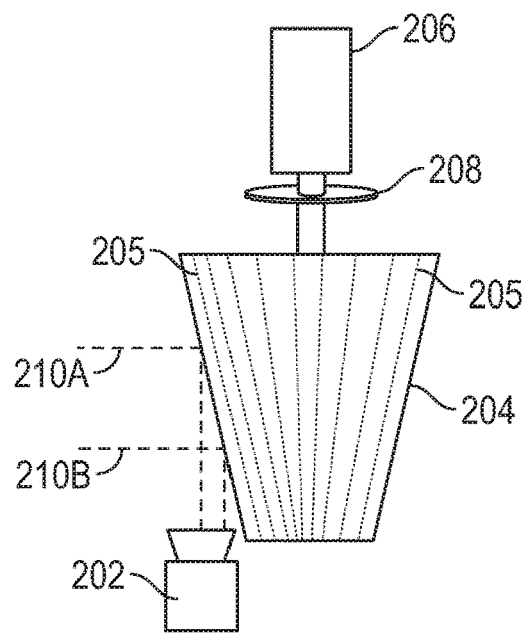
FIGS. 2A-2B illustrate top and side views of an alternative scanning LiDAR configuration according to examples of the disclosure.
Figure 2B:
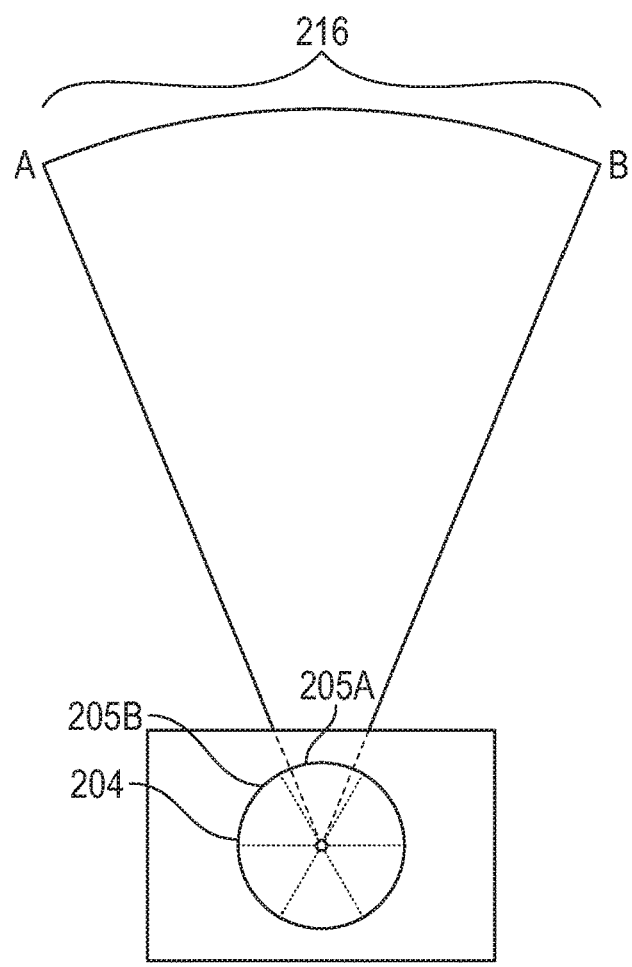

FIGS. 2A-2B illustrate top and side views of an alternative scanning LiDAR configuration according to examples of the disclosure. FIG. 2A illustrates an alternative LiDAR configuration 200 including a rotatable mirror assembly according to examples of the disclosure. In some examples, a laser light source 202 (which can correspond to laser light source 102 above) can be an illumination source for illuminating a scene (e.g., the driving path). In some examples, the laser light source 202 can provide continuous laser illumination. In other examples, the laser light source can provide pulses of illumination. In some examples, timing of the laser light pulses for a pulsed lased light source 202 can be controllable. In some examples, the laser light source 202 can provide more than one laser beam in parallel at slightly offset locations relative to the rotatable mirror assembly 204. In some examples, the light beams from laser light source 202 can be aligned with a rotatable mirror assembly 204 (which can correspond to the rotatable mirror 104 above). In some examples, the rotatable mirror assembly can be constructed from multiple identical mirror segments 205. In some examples, a motor 206 (which can correspond to motor 106) can be connected by a shaft to the rotatable mirror assembly 204 for rotating the rotatable mirror assembly. In some examples, a position encoder 208 can be included to provide position (i.e., angle) information of the rotatable mirror assembly 204. In some examples, as the rotatable mirror assembly rotates, reflected light beams 210A and 210B (e.g., from two light beams emitted by the light source 202) can be transmitted at different heights due to being reflected by different points on one of the mirror segments 205. In some examples, the two light beams 210A and 210B can thus be used to detect objects on roughly parallel planes at different heights simultaneously. One or more light sensors (not shown) can also be included in the LiDAR configuration 200, either co-located with the laser light source 202 or located separate from the laser light source. In some examples, one light sensor can be provided for each beam transmitted from the laser light source 202. In some examples, as the rotatable mirror assembly 204 rotates, the mirror segment 205 that is nearest to the light source can cause the reflected light to sweep across a scan arc.

FIG. 2B illustrates a top view of LiDAR configuration 200 illustrating one exemplary scan arc that can correspond to a sweep generated by reflection from a single mirror segment 205 of the rotatable mirror assembly 204. In some examples, as the rotatable mirror assembly 204 rotates clockwise, light first contacts a particular mirror segment 205A in a particular revolution of the rotatable mirror assembly at time t1. In some examples, light from the laser light source 202 (e.g., beams 210A and 210B above) can be directed toward the direction of point A at t1. In some examples, as the rotatable mirror assembly rotates 204 in the clockwise direction, the direction of reflected light beams (e.g., beams 210A and 210B above) can also rotate in the same direction, eventually reaching point B at time t2. In some examples, time t2 can correspond to the moment in time when the laser light beams last contact the particular mirror segment 205A in a particular revolution of the rotatable mirror assembly. In some examples, at the next moment in time after t2, the light beam(s) from the laser light source 202 will contact mirror segment 205B, and the reflected light beams 210A and 210B can be directed toward the direction of point A again. As the rotatable mirror assembly 204 continues to rotate around, each mirror segment can produce a scan between the points A and B. It should be understood from FIG. 2B that for a single revolution of the rotatable mirror assembly 204, the number of scans between points A and B can be equal to the number of mirror segments 205. Thus, one advantage of the rotatable mirror assembly 204 can be that the scan rate of the LiDAR can be a multiple of the rotation rate provided by the motor 206, and a slower rate of rotation of the motor can provide the desired scan rate. In some examples, the scan angle provided by the LiDAR system can be smaller than the scan angle provided by the LiDAR of FIGS. 1A-1B. In some examples, because each of the mirror segments 205 can be identical, each scan can correspond to a same set of fixed heights relative to the vehicle. The fixed heights of the beam scans can be selected to provide adequate performance in most driving conditions. However, an adjustable LiDAR that can provide scans with variable heights can provide improved performance as will be described in the examples below. As described above, the light sensor(s) can be used to detect the position and distance of objects within the scan area of the LiDAR.

FIGS. 3A-3D illustrate exemplary driving conditions and associated laser light beam orientations that can be provided by an adjustable LiDAR system according to examples of the disclosure. In FIGS. 3A-3D, a LiDAR system 304 (which can correspond to LiDAR system 202 above or LiDAR system 402 below) is illustrated mounted to the roof of vehicle 300. It should be understood that multiple LiDAR systems 304 can be attached to a vehicle and that LiDAR systems can be placed in different locations on the vehicle to survey different directions. In each of the FIGS. 3A-3D, the scan patterns 306A-306D illustrate aiming directions (also referred to as heights in this disclosure) for eight beams (e.g., beams 210A/210B above and six additional beams) that can be used to simultaneously scan at eight different heights.

Figure 3A:
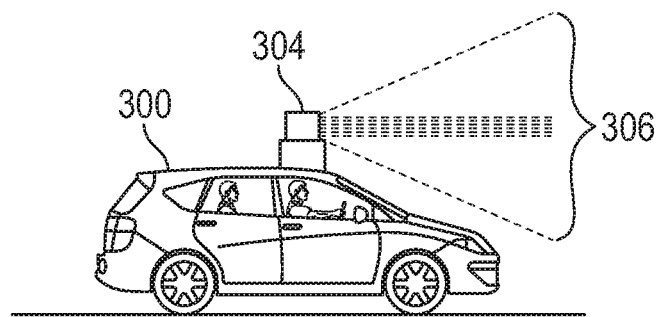
FIGS. 3A-3D illustrate exemplary driving conditions and associated laser light beam orientations that can be provided by an adjustable LiDAR system according to examples of the disclosure.

FIG. 3A illustrates vehicle 300 driving on a flat road. When driving on a flat road, it can be expected that the primary direction of interest to scan with the LiDAR system is directly in front of the vehicle 300 where pedestrians, vehicles, and other objects and obstacles are most expected to be. Thus, it can be seen that scan pattern 306A has six laser light beams pointing straight ahead at different heights. Scan pattern 306A can also include one laser light beam pointing in an upward direction, which can be used to detect overhead clearances, vehicles that are taller than vehicle 300, or any other object that might be located above the vehicle. Similarly, scan pattern 306A can include one laser light beam that is pointed in a downward direction, which can be used to detect objects that are likely to be near to the ground, such as speed bumps, potholes, small children, pets, or any other low object that might be detected by the LiDAR system 304. It should be understood that the specific number of eight laser light beams pointing in different directions is merely provided for illustrating the principles of the present disclosure. The total number of laser light beams, the distribution of light beams in different directions, and the orientation of the light beams can vary from the illustrations and descriptions of the figures while still remaining within the scope of the disclosure.

Figure 3B:
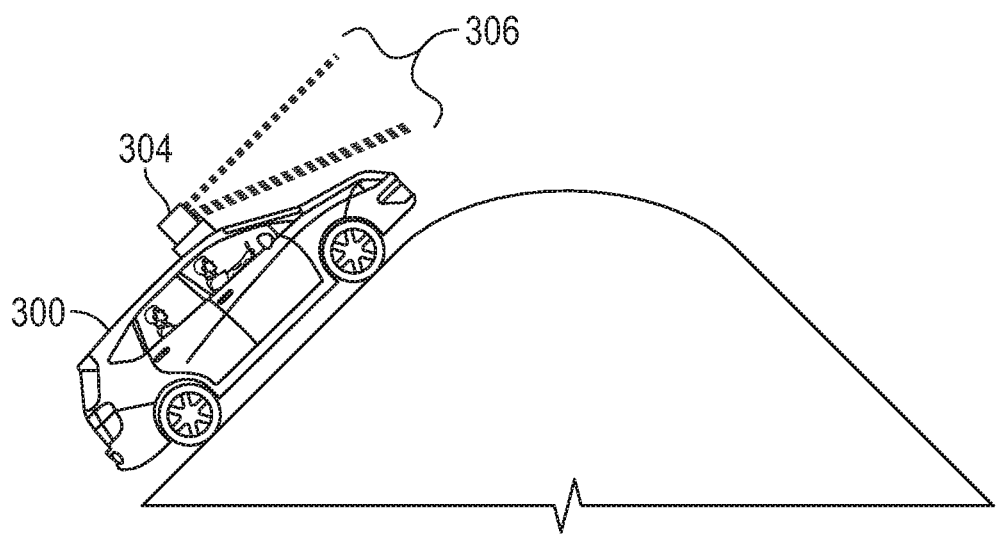

FIG. 3B illustrates a vehicle 300 that is approaching the crest of a hill and can utilize a scan pattern 306B different from the scan pattern 306A above. In some examples, as the vehicle 300 approaches the crest of the hill, any laser light beams emitted directly forward from the LiDAR system 304 will no longer be parallel to the road as the road begins to slope downwardly. In the illustrated example, the six forward facing laser light beams of scan pattern 306A may no longer be pointing in the direction of oncoming traffic, while the one downward facing laser light beam could be the only beam capable of detecting oncoming traffic or other road conditions or obstacles. In the illustrated situation, it could thus be advantageous for the LiDAR scan pattern to be adjustable to allow a change in the direction for one or more beams of the scan pattern. Scan pattern 306B illustrates an adjusted pattern where more of the laser light beams can be directed in a downward direction. As illustrated, three downward facing beams can point toward the road, which is three times as many beams pointing toward the road when compared to scan pattern 306A for the same vehicle orientation. It can be expected that the likelihood of detecting objects and obstacles can increase when more of the beams are pointed in the direction of the road.

Figure 3C:
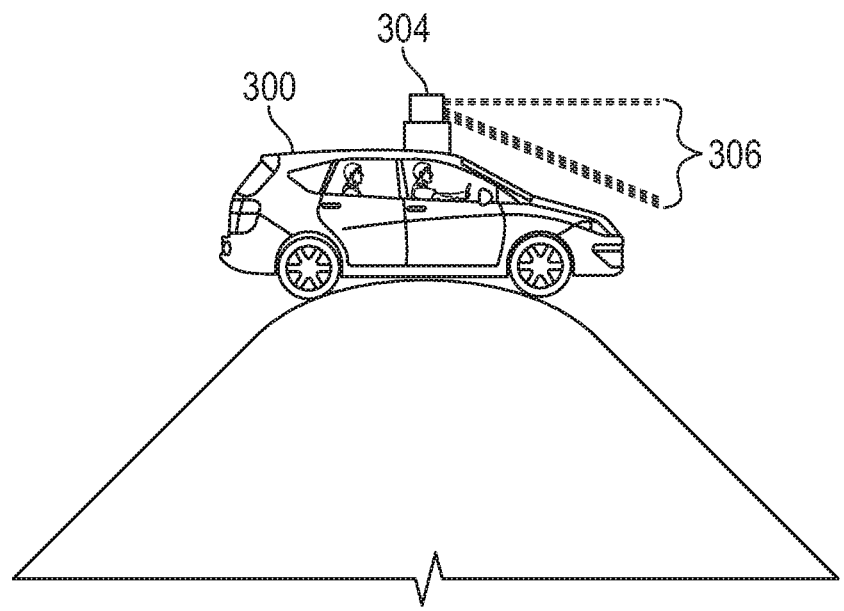

FIG. 3C illustrates the vehicle 300 at the crest of the hill, where the scan pattern 306C can also direct more beams in the downward direction toward the direction of the road. As with the scan pattern 306B, the scan pattern 306C can increase the likelihood of detecting objects and obstacles when compared with scan pattern 306A for the illustrated orientation of the vehicle 300. In addition to the crest of a hill, a scan pattern that directs more beams in a downward direction can be desirable when vehicle 300 encounters a speed bump. It should be understood from the illustrations that near the bottom of a hill or at a dip in the road, a scan pattern that directs more beams in an upward direction can direct more laser light beams in the direction that objects are likely to be located. In some examples, the orientation of the vehicle relative to the road can be determined at least in part on an inertial measurement unit (IMU), and the information from the IMU can be used to help determine which scan pattern will provide the most useful data.

Figure 3D:
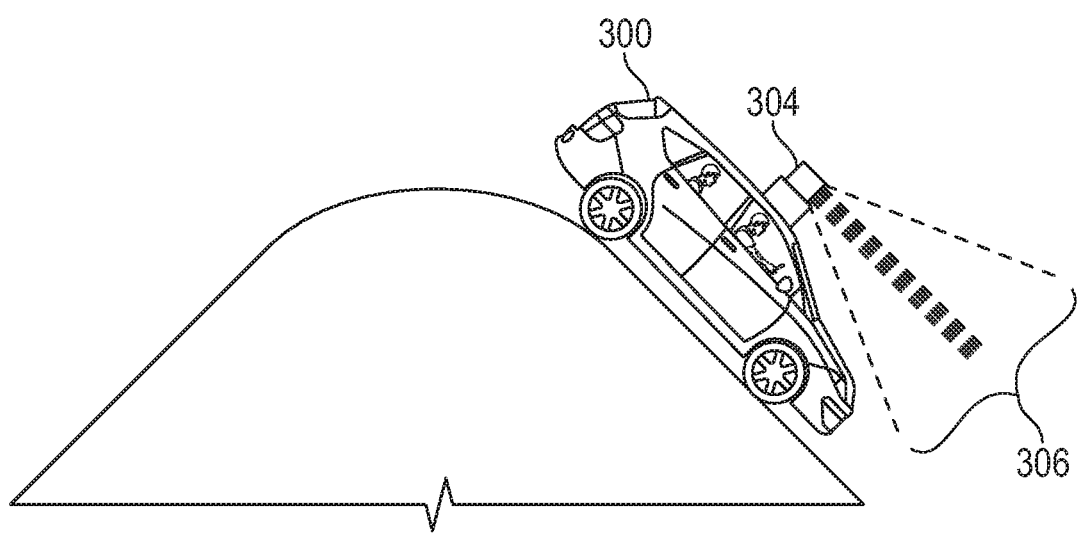

FIG. 3D illustrates the vehicle 300 after passing the top of the hill, where the scan pattern 306D has been adjusted to have an identical pattern to the scan pattern 306A. In the illustrated example, most of the laser light beams are again directed in the forward direction. When the vehicle is level relative to the road, it can be expected that objects and obstacles are most likely to be located directly in front of the vehicle. However, some visibility can be provided for both higher and lower objects with one beam directed upward and one beam directed downward.

Figure 4A:
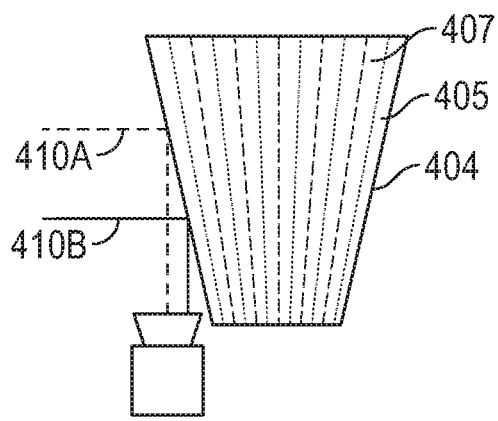
FIGS. 4A-4C illustrate a side view and a top view of a LiDAR assembly including a modified rotatable mirror assembly 404 (which can correspond to rotatable mirror assembly 204 above) and exemplary modified rotatable mirror assembly configurations according to examples of the disclosure.
Figure 4B:
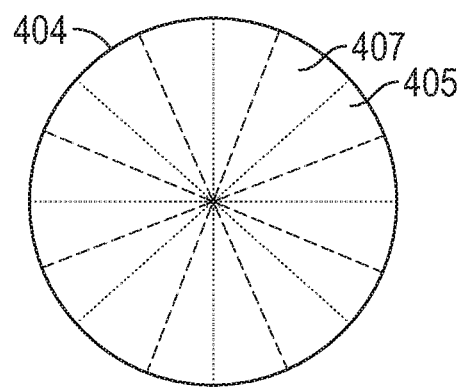
Figure 4C:
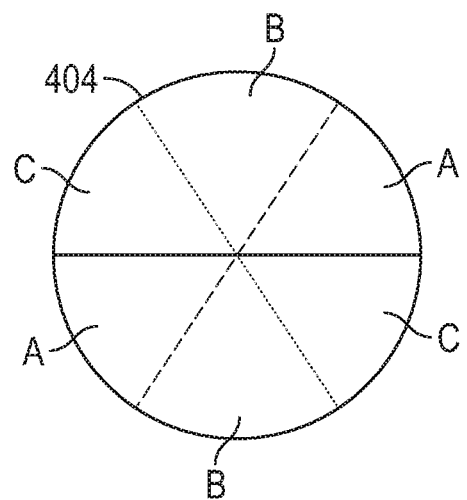

FIGS. 4A-4C illustrate a side view and a top view of a LiDAR assembly including a modified rotatable mirror assembly 404 (which can correspond to rotatable mirror assembly 204 above) and exemplary modified rotatable mirror assembly configurations according to examples of the disclosure. FIG. 4A illustrates a side view of LiDAR system 400 including the modified rotatable mirror assembly 404 and a laser light source 402 that can produce multiple laser light beams 410A and 410B. The laser light beams 410A and 410B can be transmitted by the LiDAR system at different heights due to being reflected by different points on one of the mirror segments (e.g., 405, 407, A, B, or C in the Figs. below). In some examples, the laser light source can produce more than two laser light beams (e.g., eight beams as shown in the various scan patterns of the disclosure). In contrast to the identical mirror segments 205 in FIG. 2, the modified rotatable mirror assembly 404 can include two or more different types of mirror segments.

FIG. 4B illustrates a top view of a first exemplary modified rotatable mirror assembly 404 with alternating mirror segments 405 and 407. Differences between mirror segments 405 and 407 can include, but are not limited to shape of the mirror segments and angle of orientation of the mirror segments relative to incident laser light beams from the laser light source 402. As the modified rotatable mirror assembly 404 rotates, each mirror segment 405 and 407 can produce a scan (e.g., between points A and B) as described regarding FIG. 2B. In some examples, the mirror segments 405 and 407 can have the same shape (e.g., flat) but the first segments 405 can have a first angle of orientation and the second mirror segments 407 can have a second angle of orientation. In some examples, the first mirror segments 405 can have a first shape and second the mirror segments 407 can have a second shape, different from the first shape. By varying the shape and/or angle of orientation of the different mirror segments, the modified rotatable mirror assembly can be used to produce multiple different scan patterns (e.g., scan patterns 306A-306D above) as will be described in more detail below. It should be understood that while an alternating pattern of two different mirror segments 405 and 407 is illustrated, more than two different mirror segment shapes/and or orientations can be used while remaining within the scope of the present disclosure.

FIG. 4C illustrates a second exemplary modified rotatable mirror assembly 404 comprised of three different mirror segments A, B, and C. As described above regarding FIG. 4B, as the modified rotatable mirror assembly 404 rotates, each mirror segment A, B, C can produce a scan (e.g., between points A and B) as described regarding FIG. 2B above. The examples that follow illustrate two exemplary sets of mirror segments A, B, and C that can used to produce different scan patterns (e.g., scan patterns 306A-306D above), as well as a variety of other patterns as will be described in more detail below.

Figure 5A:
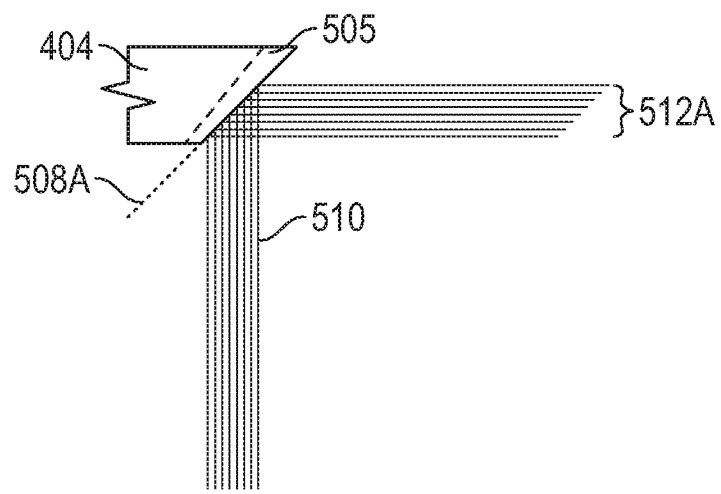
FIGS. 5A-5C illustrate three exemplary mirror segment orientations and corresponding scan patterns that can be included in a modified rotatable mirror assembly according to examples of the disclosure.
Figure 5B:
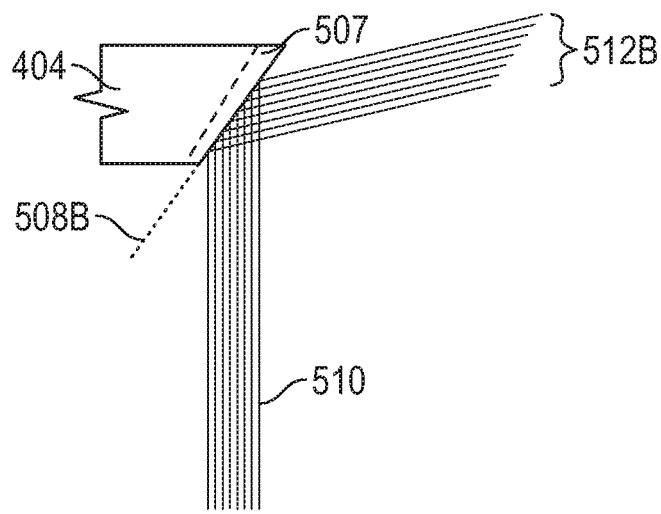
Figure 5C:
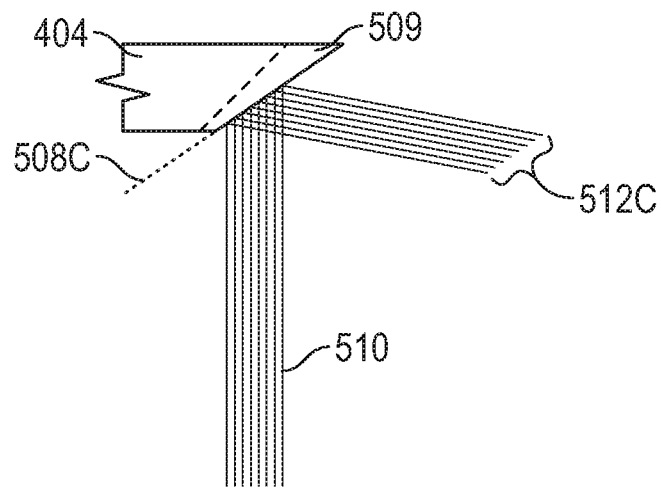

FIGS. 5A-5C illustrate three exemplary mirror segment orientations and corresponding scan patterns that can be included in a modified rotatable mirror assembly (e.g., 404 above) according to examples of the disclosure. FIG. 5A illustrates a first mirror segment 505 of the modified rotatable mirror assembly 404 that can be oriented relative to incident laser light beams 510 to produce a right angle reflection. The dotted line 508A shows an extension of the slope of the mirror face relative to the incident laser light beams 510. The resulting scan pattern 512A can correspond to having all of the laser light beams pointing forward from the front of the LiDAR system. FIG. 5B illustrates a second mirror segment 507 oriented with the slope of dotted line 508B which is more vertical slope relative to the incident laser light beams 510, and thus produces a scan pattern 512B that is pointing upward relative to the scan pattern 512A. FIG. 5C illustrates a third mirror segment 509 oriented with the slope of dotted line 508C which is a less vertical slope relative to the incident laser light beams 510, and thus produces a scan pattern 512C that is pointing downward relative to the scan pattern 512A. As will be described further below, the scan patterns produced by the three mirror segments can be used to produce any of the scan patterns 306A-306D as well as other desired combinations of upward, downward, and forward beams in a scan pattern.

Figure 8A:
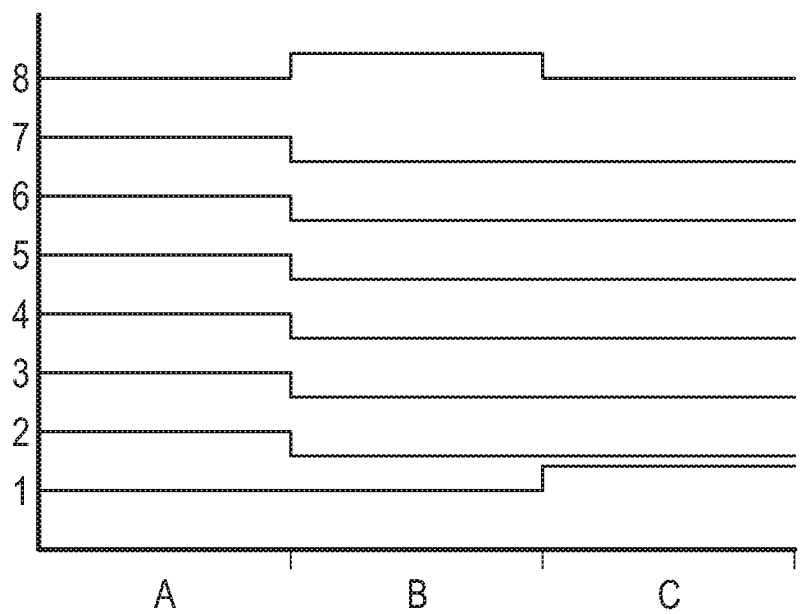
FIGS. 8A and 8B illustrate exemplary timing diagrams that can be used to dynamically generate two different scan patterns using a combination of the scan patterns illustrated in FIGS. 5A-5C.
Figure 8B:
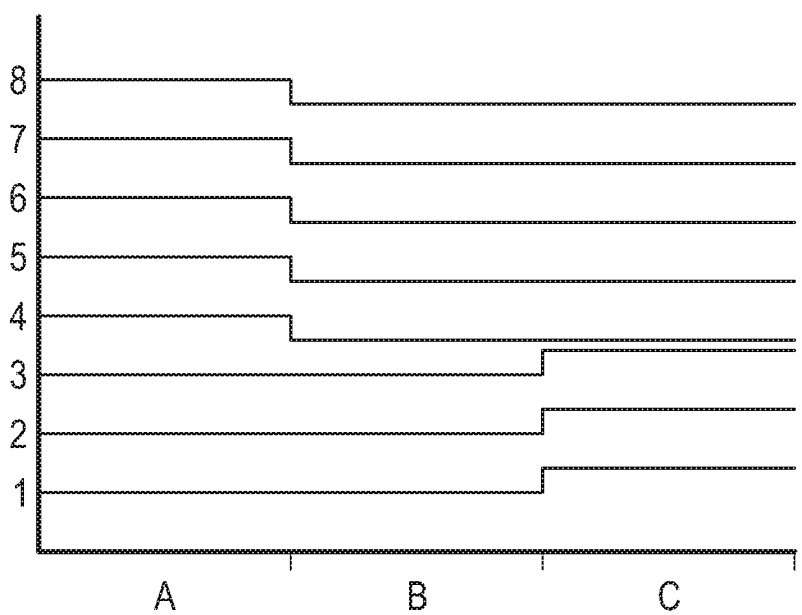

In some examples, the mirror segments A, B, and C in FIG. 4C can correspond to mirror segments 505, 507, and 509 in FIGS. 5A-5C respectively. It should be understood based on the disclosure above that as the modified rotatable mirror assembly 404 rotates in a clockwise direction, each successive scan pattern 512A, 512B, and 512C can be scanned by a LiDAR system in a repeating pattern. By timing pulsing of the laser light beams from the laser light source (e.g., 402 above) and/or timing the sample time of the light sensor(s) (e.g., 214 above) to coincide with a desired scan pattern (e.g., 512A, 512B, or 512C), the scanning direction of the LiDAR system can be dynamically adjusted. For example, a LiDAR system incorporating the modified rotatable mirror assembly 404 described directly above can dynamically adjust from using data from scan pattern 306A in FIG. 3A to using data from the scan pattern 306B-306C in FIGS. 3B and 3C, to using the data from scan pattern 306D in FIG. 3D simply by changing the timing of light transmission and/or sampling to coincide with the desired scan pattern (and desired mirror segment shape). A timing diagram illustrating dynamic adjustment of scan patterns is illustrated in FIGS. 8A and 8B below.

Figure 6A:
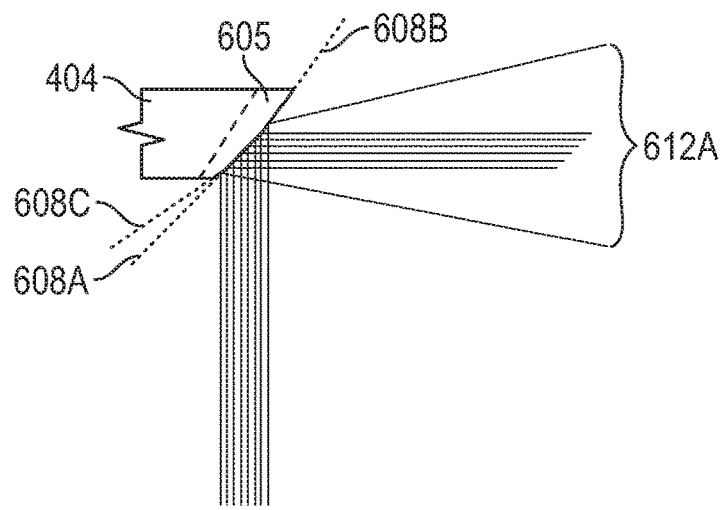
FIGS. 6A-6C illustrate three exemplary mirror segment shapes and corresponding scan patterns that can be included in a modified rotatable mirror assembly according to examples of the disclosure.
Figure 6B:
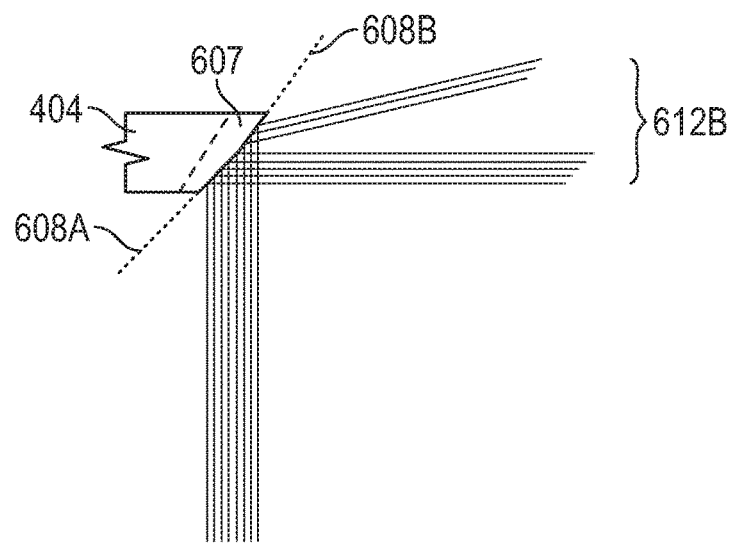
Figure 6C:
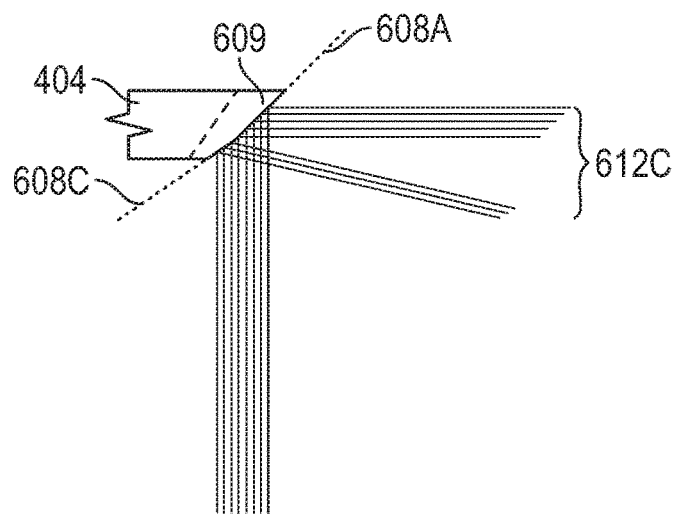

FIGS. 6A-6C illustrate three exemplary mirror segment shapes and corresponding scan patterns that can be included in a modified rotatable mirror assembly (e.g., 404 above) according to examples of the disclosure. FIG. 6A illustrates a mirror segment 605 that can produce the scan pattern 612A corresponding to the scan patterns 306A and 306D in FIGS. 3A and 3D. In some examples, the shape of the mirror segment 605 can have three facets, each with a different angle relative to the incoming laser light. In some examples, the far left illustrated incident laser light beam can be aligned with the first facet that has a slope 608C (which can correspond to slope 508C above), and the resulting reflected light can point in a downward direction. In some examples, the six central beams can be aligned with a second facet that has a slope 608A (which can correspond to slope 508A above), and the light can reflect at a right angle relative to the incident light, directing the beams forward. In some examples, the far right illustrated incident laser light beam can be aligned with the third facet that has a slope 608B (which can correspond to slope 508B above) and the resulting reflected light can point in an upward direction. In contrast to the examples above in FIGS. 5A-5C, by providing different facets of the mirror segment with different angles relative to the incident laser light beams, a single mirror segment can be used to direct beams in different directions. FIG. 6B illustrates a mirror segment 607 that can produce the scan pattern 612B. As illustrated, mirror segment 607 includes two facets, one facet having slope 608A that can reflect incident light at a right angle and direct the beams forward and the second facet having slope 608B that can reflect incident light in the upward direction. FIG. 6C illustrates a mirror segment 609 that can produce the scan pattern 612C (which can correspond to scan patterns 306B and 306C above). As illustrated, mirror segment 609 includes two facets, one facet having a slope 608C that can reflect incident light in a downward direction and the second facet having a slope 608A that can reflect incident light at a right angle and direct the beams forward. It should be understood that while the mirror segments 605, 607, and 609 are illustrated as having multiple flat facets, curved surfaces can also be used to generate different reflection angles for different laser light beams to produce scan patterns similar to any of the scan patterns illustrated above.

In some examples, the mirror segments A, B, and C in FIG. 4C can correspond to mirror segments 605, 607, and 609 in FIGS. 6A-6C respectively. It should be understood based on the disclosure above that as the modified rotatable mirror assembly 404 rotates in a clockwise direction, each successive scan pattern 612A, 612B, and 612C can be scanned by a LiDAR in a repeating pattern. By timing pulsing of the laser light from the laser light source (e.g., 202 above) and/or timing the sample time of the light sensor(s) to coincide with a desired scan pattern (e.g., 612A, 612B, or 612C), the scanning direction of the LiDAR system can be dynamically adjusted. For example, a LiDAR system incorporating the modified rotatable mirror assembly 404 described directly above can dynamically adjust from using data from scan pattern 612A in FIG. 3A to using data from the scan pattern 612C in FIGS. 3B and 3C, to using the data from scan pattern 612A in FIG. 3D simply by changing the timing of light transmission and/or sampling to coincide with the desired scan pattern (and desired mirror segment shape).

Figure 7A:
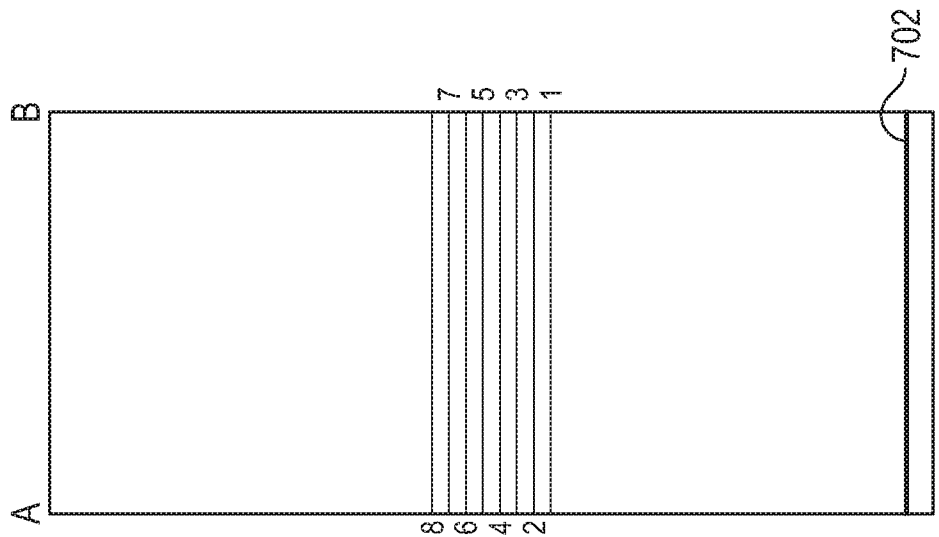
FIGS. 7A-7C illustrate scan patterns that can correspond to the scan patterns produced by mirror segments of FIGS. 5A-5C.
Figure 7B:
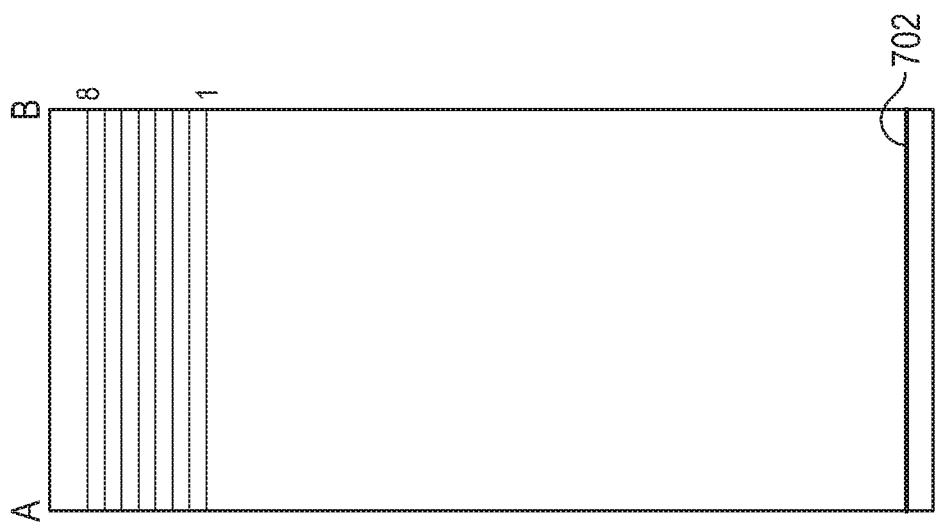
Figure 7C:
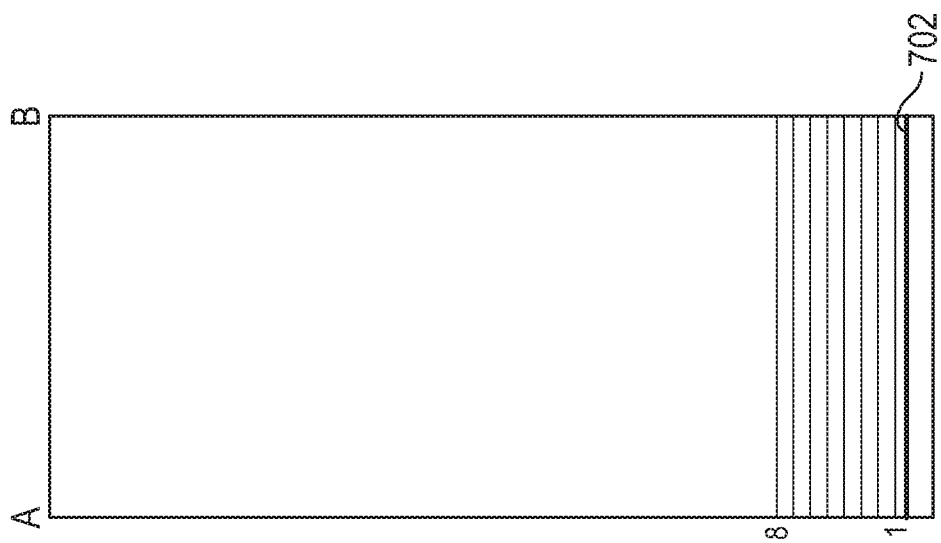

FIGS. 7A-7C illustrate scan patterns that can correspond to the scan patterns produced by mirror segments 505, 507, and 509 of FIGS. 5A-5C respectively (i.e., scan patterns 512A-512C above). Each of the lines 1-8 can represent a scan for each of eight incident light beams from a laser light source between points A and B as depicted in FIG. 2B. The road height 702 (illustrated as a dark line) can represent the position of the road relative to the scan patterns for a vehicle that is travelling level to the road (e.g., as shown in FIGS. 3A and 3D). Each of the scan patterns illustrated corresponds to a single representative distance ahead of the vehicle incorporating the LiDAR system of the disclosure. The illustrated distance selected for purposes of this illustration corresponds to a distance at which the lowest downward directed beam from mirror section 509 would scan the road surface 702. This representative distance is illustrated in FIG. 3A by the line I-I'. FIG. 7A illustrates the scan pattern 512A (see FIG. 5A) where all of the beams can be directed forward by the mirror segment 505. The illustrated heights of beams 1-8 can approximate the field of view that a driver has when viewing out of the front windshield of a vehicle and looking straight ahead. This height can correspond to the direction where objects are most likely to be detected by the LiDAR system. FIG. 7B illustrates the scan pattern 512B (see FIG. 5B) where all of the beams can be directed upward by the mirror section 507. The illustrated heights of beams 1-8 can approximate the field of view that a driver has when looking upward into the sky to determine overhead clearances, for example. It should be understood that at distances closer than the representative distance in the figure, the beams 1-8 can be closer to the road 702 (but still above scan pattern 512A), and at distances farther than the representative distance, the beams 1-8 can be higher above the road. FIG. 7C illustrates the scan pattern 512C (see FIG. 5C) where all of the beams 1-8 can be directed downward by mirror section 509. The illustrated heights of beams 1-8 can approximate the field of view that a driver has when looking downward toward the road to determine road conditions, for example. It should be understood that at distances closer than the representative distance in the figure, the beams 1-8 can be higher above the road height 702 (but still below scan pattern 512A).

Referring back to FIGS. 3B-3C, the position of the road as the vehicle reaches the top of a hill can actually be significantly lower relative to the scan pattern 512A illustrated in FIG. 7A. In that state of the vehicle, the downward angled beams (i.e., scan pattern 512C) can be pointing in the direction where objects are most likely to be detected by the LiDAR system. However, even in this orientation of the vehicle the scan pattern 512C alone may miss relevant information about objects located above the road. As will be described in further detail immediately below, by controlling timing of the transmission and/or sampling of the LiDAR, the three scan patterns 512A-512C can be used to provide controllable dynamic adjustment of the scan pattern.

FIGS. 8A and 8B illustrate exemplary timing diagrams that can be used to dynamically generate two different scan patterns selectively using a combination of the scan patterns illustrated in FIGS. 5A-5C. FIG. 8A illustrates an exemplary timing diagram that can be used to dynamically generate a first scan pattern using a combination of the scan patterns 512A, 512B, and 512C. As explained above, in some examples, the mirror segments A, B, and C in FIG. 4C can correspond to mirror segments 505, 507, and 509 in FIGS. 5A-5C respectively. In such an example, as the modified rotatable mirror assembly 404 rotates in a clockwise direction, each successive scan pattern 512A, 512B, and 512C can be scanned by a LiDAR system including the modified rotatable mirror assembly 404 in a repeating pattern. The scan phases A, B, and C along the X-axis can correspond to timing of the scan patterns 512A, 512B, and 512C respectively. Along the Y-Axis, eight timing signals are labeled, which can correspond to each of the eight laser light beam paths (e.g., 510 above) that can be provided by a laser light source (e.g., 202 above) and can be sampled by light sensor(s) (e.g., light sensors 114 above). In some examples, a high (or active) value of the timing signals can indicate that laser light sources for the indicated beams are active, while a low (or inactive) value of the timing signals can indicate that the laser light sources for the indicated beams are inactive. Alternatively, in some examples, the laser light sources for all beams can remain active during all three scan phases A, B, and C. In these examples, the high (or active) value of the timing signals can indicate that the sensor associated with a particular beam (e.g., beams 1-8) will be sampled while the low (or inactive) value of the timing signal can indicate that the sensor associated with the particular beam will not be sampled. In some examples, both the laser light transmission and the sampling of the sensors can be controlled according to the timing signals. The timing signals can be used to determine a scanning direction for each individual beam of the eight laser light beam paths. For example, as illustrated in FIG. 8A, beams 2-7 are shown with a high (or active) signal during scan phase A (corresponding to scan pattern 512A). Thus, beams 2-7 can be transmitted at the right angle direction (e.g., pointing directly forward from a vehicle). In the illustrated example, the timing signal for beam 8 has a high value during scan phase B, and thus beam 8 can be sampled in the direction of scan pattern 512B (e.g., pointing upward). Finally, the timing signal for beam 1 has a high (or active) value during scan phase C, and thus beam 1 can be sampled in the direction of scan pattern 512C (e.g., pointing downward). The resulting combined scan pattern of one beam pointing upward, six beams pointing forward, and one beam pointing downward matches the scan patterns 306A, 306D, and 612A illustrated above.

FIG. 8B illustrates a second exemplary timing diagram that can be used to generate a second scan pattern using a combination of the scan patterns 512A, 512B, and 512C. Based on the illustrated timing diagram, beams 4-8 are shown with a high (or active) signal during scan phase A (corresponding to scan pattern 512A). Thus, beams 4-8 can be transmitted at the right angle direction (e.g., pointing directly forward from a vehicle). In the illustrated example, the timing signal for beams 1-3 have a high (or active) value during scan phase C, and thus beams 1-3 can be sampled in the direction of scan pattern 512C (e.g., pointing downward). The resulting combined scan pattern of five beams pointing forward and three beams pointing downward matches the scan patterns 306B, 306C, and 612C illustrated above. As should be understood from the descriptions above, the above technique can be used to dynamically generate a scan pattern having beams pointing in different directions by selectively choosing data from individual scans in which all beams point in the same direction (e.g., scan patterns 512A, 512B, and 512C above) by controlling timing of transmitting the beams and/or sampling the light sensors.

Figure 9A:
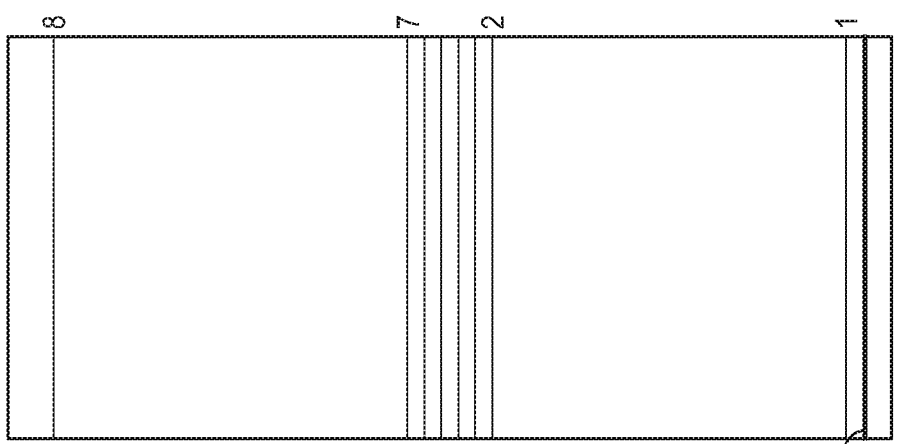
FIGS. 9A-9C illustrate scan patterns that can correspond to the scan patterns produced by mirror segments of FIGS. 6A-6C
Figure 9B:
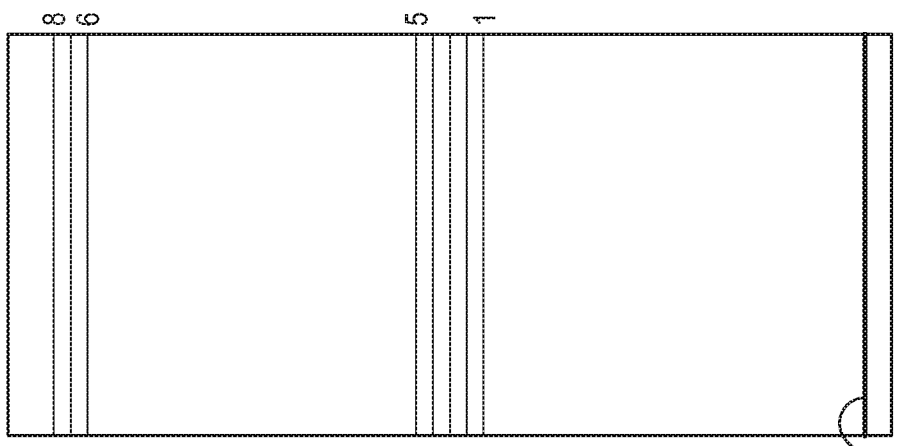
Figure 9C:
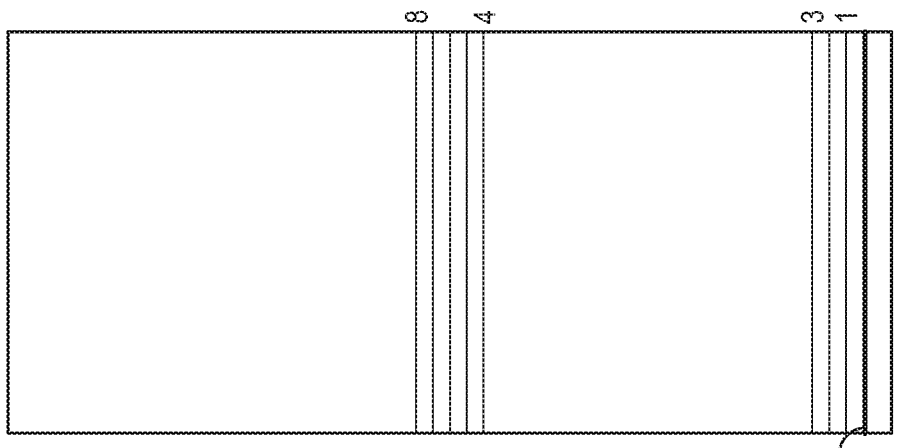

FIGS. 9A-9C illustrate scan patterns that can correspond to the scan patterns produced by mirror segments 605, 607, and 609 of FIGS. 6A-6C respectively (e.g., scan patterns 612A-612C above). Each of the lines 1-8 can represent a scan for each of eight incident light beams from a laser light source between points A and B as depicted in FIG. 2B. The road height 902 (illustrated as a dark line) can represent the position of the road relative to the scan patterns for a vehicle that is travelling level to the road surface (e.g., as shown in FIGS. 3A and 3D). Each of the scan patterns illustrated corresponds to a single representative distance ahead of the vehicle incorporating the LiDAR system of the disclosure. The illustrated distance selected for purposes of this illustration corresponds to a distance at which the lowest downward directed beam would scan the road at road height 902. This representative distance is illustrated in FIG. 3A by the line I-I'. FIG. 9A illustrates the scan pattern 612A, having one beam directed downward, six beams directed forward, and one beam directed upward. FIG. 9B illustrates the scan pattern 612B, having five beams directed forward and three beams directed upward and FIG. 9C illustrates the scan pattern 612C having five beams directed forward and three beams directed downward. As explained above regarding FIG. 7, the heights of the upward and downward beams can vary as a function of distance.

Figure 10:
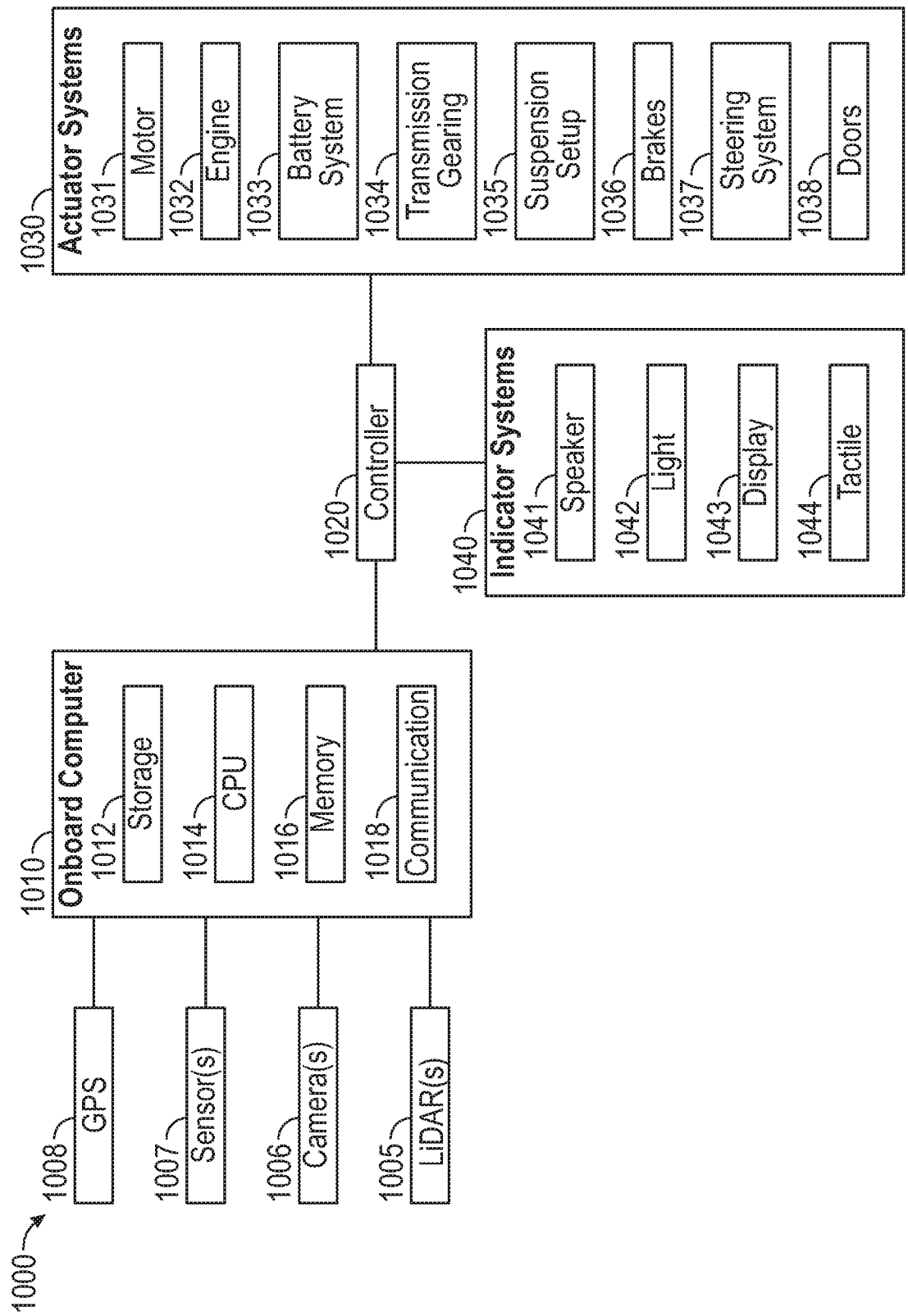
FIG. 10 illustrates an exemplary system block diagram of vehicle control system according to examples of the disclosure.

FIG. 10 illustrates an exemplary system block diagram of vehicle control system 1000 that can incorporate the adjustable LiDAR system described above according to examples of the disclosure. System 1000 can be incorporated into a vehicle, such as a consumer automobile. Other example vehicles that may incorporate the system 1000 include, without limitation, airplanes, boats, or industrial automobiles. Vehicle control system 1000 can include one or more cameras 1006 capable of capturing image data (e.g., video data) for determining various characteristics of the vehicle's surroundings, as described above. Vehicle control system 1000 can include a LiDAR sensor 1005 according to examples of the disclosure above. Vehicle control system 1000 can use the LiDAR data to detect the vehicle's surroundings such as objects and obstacles within the detection range of the LiDAR system. Vehicle control system 1000 can also include one or more other sensors 1007 (e.g., radar, ultrasonic, IMU etc.) capable of detecting various characteristics of the vehicle and the vehicle's surroundings, and a Global Positioning System (GPS) receiver 1008 capable of determining the location of the vehicle.

Vehicle control system 1000 can include an on-board computer 1010 that is coupled to the LiDARs 1005, cameras 1006, sensors 1007, and GPS receiver 1008 that is capable of receiving image data from the cameras and/or outputs from the LiDAR, the sensors 1007, and the GPS receiver 1008. The on-board computer 1010 can be capable of controlling the operation of the one or more LiDARs 1005 to dynamically adjust the scan pattern of one or more of the LiDARs. On-board computer 1010 can include storage 1012, memory 1016, communications interface 1018, and a processor 1014. Processor 1014 can perform any of the methods described with reference to FIGS. 1A-1E and 2-4. Additionally, communications interface 1018 can perform any of the communication notifications described with reference to the examples above. Moreover, storage 1012 and/or memory 1016 can store data and instructions for performing any of the methods described with reference to FIGS. 1-9 above. Storage 1012 and/or memory 1016 may also be used for storing timing waveforms for dynamically adjusting scan patterns of the LiDAR 1005. Storage 1012 and/or memory 1016 can be any non-transitory computer readable storage medium, such as a solid-state drive or a hard disk drive, among other possibilities. The vehicle control system 1000 can also include a controller 1020 capable of controlling one or more aspects of vehicle operation, such as performing autonomous driving and/or parking maneuvers according to instructions from on-board computer 1010. It should be noted that sensor data from multiple sensors can be fused together (e.g., LiDAR data, RADAR data, ultrasonic sensor data, camera data, IMU data etc.). This fusion can occur at one or more electronic control units (ECUs). The one or more ECUs that are chosen to perform data fusion can be based on an amount of resources (e.g., processing power and/or memory) available to the one or more ECUs, and can be dynamically shifted between ECUs and/or components within an ECU (since an ECU can contain more than one processor) to optimize performance (e.g., performance of autonomous driving and parking maneuvers).

In some examples, the vehicle control system 1000 can be connected to (e.g., via controller 1020) one or more actuator systems 1030 in the vehicle and one or more indicator systems 1040 in the vehicle. The one or more actuator systems 1030 can include, but are not limited to, a motor 1031 or engine 1032, battery system 1033, transmission gearing 1034, suspension setup 1035, brakes 1036, steering system 1037 and door system 1038. The vehicle control system 1000 can control, via controller 1020, one or more of these actuator systems 1030 during vehicle operation; for example, to control the vehicle during autonomous driving or parking operations by the on-board computer 1010, using the motor 1031 or engine 1032, battery system 1033, transmission gearing 1034, suspension setup 1035, brakes 1036 and/or steering system 1037, etc. Actuator systems 1030 can also include sensors that send dead reckoning information (e.g., steering information, speed information, etc.) to on-board computer 1010 (e.g., via controller 1020) to estimate the vehicle's position and orientation. The one or more indicator systems 1040 can include, but are not limited to, one or more speakers 1041 in the vehicle (e.g., as part of an entertainment system in the vehicle), one or more lights 1042 in the vehicle, one or more displays 1043 in the vehicle (e.g., as part of a control or entertainment system in the vehicle) and one or more tactile actuators 1044 in the vehicle (e.g., as part of a steering wheel or seat in the vehicle).

Therefore, according to the above, some examples of the disclosure are directed to a system comprising: a laser light source, a rotatable mirror assembly comprising a plurality of mirror segments, the rotatable mirror assembly aligned to reflect light transmitted by the laser light source, wherein the plurality of mirror segments comprise a first segment that reflects a first light beam from the laser light source in a first direction, and a second mirror segment that reflects the first light beam from the laser light source in a second direction, different from the first direction, a light sensor positioned to receive light reflected from the rotatable mirror assembly, a motor for rotating the mirror assembly about a rotation axis, a position encoder for determining a rotational position of the rotatable mirror assembly, and a controller for controlling a sampling phase of sampling the light sensor. Additionally or alternatively to one or more of the examples disclosed above, in some examples, rotation of the mirror assembly causes light from the laser light source to reflect from the first mirror segment during a first scan phase and from the second mirror segment during a second scan phase. Additionally or alternatively to one or more of the examples disclosed above, in some examples, the first light beam is one of a plurality of light beams from the laser light source, and the controller controls the sampling phase of sampling the light sensor to: sample the first light beam of the plurality of light beams during the first scan period while not sampling a second light beam of the plurality of light beams, and sample the second light beam of the plurality of light beams during the second scan period while not sampling the second light beam of the plurality of light beams. Additionally or alternatively to one or more of the examples disclosed above, in some examples, the first mirror segment is disposed on the rotatable mirror assembly at a first angle relative to the rotation axis and the second mirror segment is disposed on the rotatable mirror assembly at a second angle relative to the rotation axis, and the first and second angles are different. Additionally or alternatively to one or more of the examples disclosed above, in some examples, the system further comprises a third mirror segment disposed on the rotatable mirror assembly at a third angle relative to the rotation axis, wherein the third angle is different from the first and second angles. Additionally or alternatively to one or more of the examples disclosed above, in some examples, the first mirror segment has a first shape and the second mirror segment has a second shape. Additionally or alternatively to one or more of the examples disclosed above, in some examples, the first mirror segments has a plurality of facets, the first light beam from the laser light source is reflected by a first facet of the first mirror segment in the first direction, and a second light beam from the laser light source is reflected by a second facet of the first mirror segment in a third direction. Additionally or alternatively to one or more of the examples disclosed above, in some examples, the second and third directions are the same. Additionally or alternatively to one or more of the examples disclosed above, in some examples, a vehicle includes the system above, and controlling the sampling phase of sampling the light sensor is based on an orientation of the vehicle relative to a slope of a road.

Some examples of the disclosure are directed to a method comprising: directing a plurality of laser light beams toward a rotatable mirror assembly, rotating the rotatable mirror assembly about a rotation axis, sensing received at a light sensor positioned to receive light reflected from the rotatable mirror assembly, determining a rotational position of the rotatable mirror assembly comprising a plurality of mirror segments, and determining a location of an object based on the sensing of the received light at the light sensor and the rotational position of the rotatable mirror assembly, wherein the plurality of mirror segments comprise a first segment that reflects a first light beam from the laser light source in a first direction, and a second mirror segment that reflects the first light beam from the laser light source in a second direction, different from the first direction.

Some examples of the disclosure are directed to a non-transitory computer-readable medium including instructions, which when executed by one or more processors, cause the one or more processors to perform a method comprising: directing a plurality of laser light beams toward a rotatable mirror assembly, rotating the rotatable mirror assembly about a rotation axis, sensing received at a light sensor positioned to receive light reflected from the rotatable mirror assembly, determining a rotational position of the rotatable mirror assembly comprising a plurality of mirror segments, and determining a location of an object based on the sensing of the received light at the light sensor and the rotational position of the rotatable mirror assembly, wherein the plurality of mirror segments comprise a first segment that reflects a first light beam from the laser light source in a first direction, and a second mirror segment that reflects the first light beam from the laser light source in a second direction, different from the first direction.

Some examples of the disclosure are directed to a vehicle comprising: one or more processors, and a memory including instructions, which when executed by the one or more processors, cause the one or more processors to perform a method comprising: directing a plurality of laser light beams toward a rotatable mirror assembly, rotating the rotatable mirror assembly about a rotation axis, sensing received at a light sensor positioned to receive light reflected from the rotatable mirror assembly, determining a rotational position of the rotatable mirror assembly comprising a plurality of mirror segments, and determining a location of an object based on the sensing of the received light at the light sensor and the rotational position of the rotatable mirror assembly, wherein the plurality of mirror segments comprise a first segment that reflects a first light beam from the laser light source in a first direction, and a second mirror segment that reflects the first light beam from the laser light source in a second direction, different from the first direction.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
a laser light source;
a rotatable mirror assembly comprising a plurality of mirror segments, the rotatable mirror assembly aligned to reflect light transmitted by the laser light source, wherein the plurality of mirror segments comprise:
a first mirror segment with a first shape, the first shape of the first mirror segment having a plurality of facets, including a first facet that reflects a first light beam from the laser light source in a first direction and a second facet that reflects a second light beam from the laser light source in a third direction simultaneous with the first facet reflecting the first light beam, and
a second mirror segment having a second shape that reflects the first light beam from the laser light source in a second direction, different from the first direction;
a light sensor positioned to receive light reflected from the rotatable mirror assembly;
a motor for rotating the mirror assembly about a rotation axis;
a position encoder for determining a rotational position of the rotatable mirror assembly; and
a controller for controlling a timing of sampling the light sensor.

2. The system of claim 1, wherein rotation of the mirror assembly causes light from the laser light source to reflect from the first mirror segment during a first scan phase and from the second mirror segment during a second scan phase.

3. The system of claim 2, wherein:
the first light beam is one of a plurality of light beams from the laser light source; and
the controller controls the timing of sampling the light sensor to:
sample the first light beam of the plurality of light beams during the first scan period while not sampling a second light beam of the plurality of light beams; and
sample the second light beam of the plurality of light beams during the second scan period while not sampling the first light beam of the plurality of light beams.

4. The system of claim 1, wherein the first mirror segment is disposed on the rotatable mirror assembly at a first angle relative to the rotation axis and the second mirror segment is disposed on the rotatable mirror assembly at a second angle relative to the rotation axis, and the first and second angles are different.

5. The system of claim 4, further comprising a third mirror segment disposed on the rotatable mirror assembly at a third angle relative to the rotation axis, wherein the third angle is different from the first and second angles.

6. The system of claim 1, wherein the second and third directions are the same.

7. The system of claim 1, wherein controlling the timing of sampling the light sensor is based on an orientation of the vehicle relative to a slope of a road.

8. The system of claim 1, wherein the first mirror segment and the second segment are each positioned tangential to a circumference about the rotation axis and at different positions along the circumference about the rotation axis.

9. The system of claim 8, wherein the first and second facet of the first mirror segment are adjacent to one another in a direction perpendicular to the circumference about the rotation axis.

10. The system of claim 9, wherein the second shape of the second mirror has a second plurality of facets, including a third facet that reflects the first light beam from the laser light source in the second direction and a fourth facet that reflects the second light beam from the laser light source in a fourth direction different from the first and second directions.

11. A method comprising:
directing a plurality of laser light beams toward a rotatable mirror assembly;
rotating the rotatable mirror assembly about a rotation axis;
sensing received at a light sensor positioned to receive light reflected from the rotatable mirror assembly;
determining a rotational position of the rotatable mirror assembly comprising a plurality of mirror segments; and
determining a location of an object based on the sensing of the received light at the light sensor and the rotational position of the rotatable mirror assembly, wherein the plurality of mirror segments comprise:
a first mirror segment with a first shape, the first shape of the first mirror segment having a plurality of facets, including a first facet that reflects a first light beam from the laser light source in a first direction and a second facet that reflects a second light beam from the laser light source in a third direction simultaneous with the first facet reflecting the first light beam, and
a second mirror segment having a second shape that reflects the first light beam from the laser light source in a second direction, different from the first direction.

12. A vehicle comprising:
one or more processors; and
a memory including instructions, which when executed by the one or more processors, cause the one or more processors to perform a method comprising:
directing a plurality of laser light beams toward a rotatable mirror assembly;
rotating the rotatable mirror assembly about a rotation axis;
sensing received at a light sensor positioned to receive light reflected from the rotatable mirror assembly;
determining a rotational position of the rotatable mirror assembly comprising a plurality of mirror segments; and
determining a location of an object based on the sensing of the received light at the light sensor and the rotational position of the rotatable mirror assembly, wherein the plurality of mirror segments comprise:
a first mirror segment with a first shape, the first shape of the first mirror segment having a plurality of facets, including a first facet that reflects a first light beam from the laser light source in a first direction and a second facet that reflects a second light beam from the laser light source in a third direction simultaneous with the first facet reflecting the first light beam, and
a second mirror segment having a second shape that reflects the first light beam from the laser light source in a second direction, different from the first direction.

* * * * *